United States Patent
Amestica Salazar

(10) Patent No.: US 11,019,824 B2
(45) Date of Patent: Jun. 1, 2021

(54) BIOCIDAL RESIN COMPOSITION INCLUDING ONE OR A PLURALITY OF RESINS SELECTED FROM MF, UF, PF, MUF AND PHENOLIC RESINS; AND MORE THAN ONE SOLUBLE COPPER SALT

(71) Applicant: Luis Alberto Amestica Salazar, Providencia Santiago (CL)

(72) Inventor: Luis Alberto Amestica Salazar, Providencia Santiago (CL)

(*) Notice: Subject to any disclaimer, the term of this patent is extended or adjusted under 35 U.S.C. 154(b) by 274 days.

(21) Appl. No.: 14/894,177

(22) PCT Filed: Oct. 3, 2013

(86) PCT No.: PCT/CL2013/000069
§ 371 (c)(1),
(2) Date: Aug. 18, 2016

(87) PCT Pub. No.: WO2015/048918
PCT Pub. Date: Apr. 9, 2015

(65) Prior Publication Data
US 2016/0353742 A1 Dec. 8, 2016

(51) Int. Cl.
*A01N 25/34* (2006.01)
*A01N 59/20* (2006.01)
*C08K 5/098* (2006.01)
*C08K 5/17* (2006.01)
*D21H 17/48* (2006.01)
*D21H 17/51* (2006.01)
*D21H 21/36* (2006.01)
*D21H 17/57* (2006.01)
*D21H 17/63* (2006.01)

(52) U.S. Cl.
CPC ............. *A01N 59/20* (2013.01); *A01N 25/34* (2013.01); *C08K 5/098* (2013.01); *C08K 5/175* (2013.01); *D21H 17/48* (2013.01); *D21H 17/51* (2013.01); *D21H 17/57* (2013.01); *D21H 17/63* (2013.01); *D21H 21/36* (2013.01)

(58) Field of Classification Search
CPC ........ A61N 59/20; A01N 25/34; C08K 5/098; C08K 5/175; D21H 17/48
See application file for complete search history.

(56) References Cited

U.S. PATENT DOCUMENTS

| | | | |
|---|---|---|---|
| 4,181,786 A | | 1/1980 | Mune et al. |
| 4,623,412 A | * | 11/1986 | Bohme |
| 7,291,596 B2 | * | 11/2007 | Hobson |
| 2004/0131874 A1 | * | 7/2004 | Tutin |
| 2005/0228351 A1 | * | 10/2005 | Bret |
| 2006/0068662 A1 | | 3/2006 | Hanrahan et al. |
| 2006/0166024 A1 | | 7/2006 | Ong et al. |
| 2007/0269563 A1 | * | 11/2007 | Mixon |
| 2010/0144913 A1 | | 6/2010 | Alteheld et al. |
| 2011/0000616 A1 | | 1/2011 | Hanrahan et al. |
| 2012/0322903 A1 | * | 12/2012 | Karandikar |

FOREIGN PATENT DOCUMENTS

| | | |
|---|---|---|
| WO | 2006078358 | 7/2006 |
| WO | 2013086647 | 6/2013 |

OTHER PUBLICATIONS

Sarika (Polymers Review, pp. 1-24, Published Sep. 28, 2020) (Year: 2020).*

* cited by examiner

Primary Examiner — Alma Pipic
(74) Attorney, Agent, or Firm — Hamre, Schumann, Mueller & Larson, P.C.

(57) ABSTRACT

A biocide resin composition that includes one or more solutions of selected melamine-formaldehyde, urea-formaldehyde, phenol-formaldehyde, melamine-urea-formaldehyde, and phenolic resins, and more than one copper salt soluble in aqueous systems and melamine-formaldehyde, urea-formaldehyde, and phenolic solutions. Copper salts are of the copper citrate, copper lysinate, copper gluconate, copper salicylate, copper phthalocyanine, copper chelate, copper oxalate, copper acetate, copper methionine, copper tartrate, copper glycinate, copper picolinate, copper aspartate, ammoniacal copper complexes, EDTA (ethylenediaminetetraacetic acid)-copper complexes, copper glycolate, copper glycerate, copper ascorbate type and, in general, copper salts of the organic type, R—Cu, R1-Cu—R2, where R, R1, and R2 can be alkyl chains ($C_3$-$C_{18}$) with one or more acid, aldehyde, ester, ether, hydroxyls, amino, or others groups in its structure.

5 Claims, No Drawings

BIOCIDAL RESIN COMPOSITION INCLUDING ONE OR A PLURALITY OF RESINS SELECTED FROM MF, UF, PF, MUF AND PHENOLIC RESINS; AND MORE THAN ONE SOLUBLE COPPER SALT

FIELD OF THE INVENTION

The invention is related to the obtaining of biocide materials that include heat-stable plastics such as melamine-formaldehyde (MF), urea-formaldehyde (UF), phenol-formaldehyde (PF), melamine-urea-formaldehyde (MUF), and phenolic resins, and copper salts. The invention is related to the obtaining of biocide compositions (anti-bacteria, anti-fungus, and anti-virus) from resins by adding, into solutions of the said resins, copper salts that are soluble in the said resins. The invention is related to the obtaining of biocide compositions (anti-bacteria, anti-fungus, and anti-virus) of the said resins by adding the said resins in the form of powder, and the inclusion of copper salts in the form of powder into the said resins.

The invention considers the inclusion of copper salts into melamine-formaldehyde (MF), urea-formaldehyde (UF), phenol-formaldehyde (PF), melamine-urea-formaldehyde (MUF) and phenolic resins, as it has been established that leaving free copper ions allows the obtaining of surfaces with biocide properties.

In order to reach its objective, the invention considers that the release of biocide agents, in the case of a salt, is defined by the ions dispersion on its surface, with a synergistic effect, by mixing soluble salts of different types of molecular weight and chemical structure.

Soluble copper salts, having organic chains, are able to interlink with the melamine-formaldehyde network, with the urea-formaldehyde network, with the phenolic network, and/or mixtures of these resins, remaining united in the structure.

Besides, the invention includes the procedure to obtain biocide materials that contain melamine-formaldehyde, urea-formaldehyde, phenol-formaldehyde, melamine-urea-formaldehyde, and phenolic resins, as well as copper salts soluble in the said resins. Resins with copper salts can be applied to a support such as paper, wood, cotton, clay, and other materials' surfaces. Besides, they may be used with no need for a support, as in the case of products obtained through molding.

BACKGROUND OF THE INVENTION

The biocide benefits of copper salts are well documented in literature. These salts, when in contact with water, release cuprous and/or cupric ions, depending on the type of salts. It is scientifically accepted that the mechanism through which fungus, bacteria, and virus are deactivated and/or eliminated by copper ions is through these ions penetration into the microorganism through the membrane. Ions penetrating these microorganisms membrane alter vital systems (the membrane permeability, protein degrading, enzymatic reaction inhibition, among many damaging effects).

Document U.S. Pat. No. 4,181,786 describes a process to obtain melamine with anti-bacteria and anti-fungus properties, which compromises the forming of an organic compound with carboxyl groups of the said properties through the reaction with silver ions. This silver organic compound is mixed with melamine. Besides the silver ions, the patent indicates that it is possible to use copper and zinc ions. The process to obtain the organic compound with copper may be through a copper with monomer reaction, an oligo-polymer. Furthermore, it indicates that a porous polymer and the inclusion of silver ions in the polymer pores are possible. Silver concentration in the polymer is in the range of 0.0009 millimoles per gram of polymer.

Document US20060166024A1 describes the inclusion of antimicrobial agents into melamine resins used in decoration and molding items with antimicrobial properties on their surface. The antimicrobial agents described are triclosan, ortho phenyl-phenol, zinc pyrithione, sodium pyrithione, biguanide, titanium dioxide, silver compounds, copper compounds, and zinc compounds. For the latter ones, there is no specification on their type. Antimicrobial agents are used in the range from 0.1 to 5% of the melamine resin weight.

Document US2011000016A1 presents the invention related to the inclusion of antimicrobial agents into the melamine resins capable of providing a permanent antimicrobial property. This is a finely divided powder dispersed in a fluid. The described antimicrobial agents are of the organic type: triclosan and metal pyrithione, preferably zinc pyrithione. The antimicrobial agent concentration is in the range from 0.3 to 1% of the melamine resin weight.

Document US20060068662, by the same authors of the invention patent application US20110000616, presents the invention related to the inclusion of antimicrobial agents in melamine resins. Agents are fine powder dispersed in a fluid. Powder antimicrobial agents dispersed in a fluid are triclosan, ortho phenyl phenol, zinc pyrithione, sodium pyrithione, barium monohydrate, zinc-containing zeolite, and zinc-containing amorphous glass powders. The weight of antibacterial powders content dispersed in fluid in the melamine resin is between 0.1 and 5%.

In general, surfaces obtained from melamine-formaldehyde, urea formaldehyde, and phenolic resins are hard, transparent, water and oil-resistant, low flammability, resistant to weak acids and other chemical products (acetone, alcohol, oils, among other), hard to scratch, heat and electricity resistant, and easy to clean.

Melamine-formaldehyde, urea formaldehyde, and phenolic resins are widely used for paper-cover for laminated wood applications and other decorative forms.

Paper impregnated with one of these resins, melamine-formaldehyde, urea formaldehyde, and phenolic, passes through an oven at 20 to 60 meter/min speed, where the resin is partially gelled. The paper surface impregnated with the partially gelled resin is pressed at high temperature and pressure on wood surfaces in order to obtain decorative wood. This wood is used to manufacture furniture, furniture covers, floor wood, floating floors, laminated floors, doors, and all types of covers. It is also possible to use other substrates that are not natural wood.

The decorative color on the wood surface is provided by the impregnated paper color and design; this is why it is so important that the surface left by the resin be transparent. There is a wide variety of colors, from white to black, passing through a rank of colors and designs, such as imitation of all kinds of woods (cedar, pine, cherry, etc.) and other motifs.

Thermo-stable plastics such as melamine-formaldehyde (MF), urea-formaldehyde (UF), phenol-formaldehyde (PF), melamine-urea-formaldehyde (MUF) and phenolic resins can also be used for other purposes, such as household items (dishes, cutlery, cups), electric items (plates, plugs, switches), bathroom items (toilet seats), door handles, containers, and decoration items using molding techniques and adhesives.

The amount of melamine-formaldehyde, urea-formaldehyde, and phenolic resin applied to surfaces depends on each application. In the case of papers, this varies between 10 and 200 grams/square meter of surface; the most used amounts in the industry are 30 to 120 grams per square meter.

In resin application, a catalyzer is used in order to promote polymerization. Generally, polymerization is carried out at a temperature between 100° C. and 250° C. The time polymerization takes at a temperature of 100° C. is called gelation (curing) time. This may vary from a few seconds to several minutes. For instance, melamine-formaldehyde resin, heated at 100° C. with no catalyzer does not polymerize; it may be heated for a long time (20 to 30 minutes) with no reaction. Furthermore, melamine and urea resins, under environmental conditions, remain without polymerizing up to 30 to 45 days.

The mix gelling time is very important for its final application. In the case of decorative figures, short gelling time is required. In the case of applications on paper to press on wood or other materials, the gelling time should be over 3 minutes and, ideally, between 5 and 7 minutes.

Other important variables in resin polymerization is pH. In the case of melamine-formaldehyde resins, the environment should be a basic one, with a desirable pH above 8.9, so that any additive added to the resins, such as anti-dust, anti-foam, and additives to improve flexibility, should not reduce the pH value from 8.9.

Microorganisms in general, be them bacteria, fungus, and other, tend to nest on surfaces that provide a habitat where to feed and reproduce. Microorganisms may survive for long periods on surfaces and transmit infections through contact. Surfaces of the melamine-formaldehyde, urea-formaldehyde, and phenolic type are not an exemption and become an infection vector, as in the case of furniture with this type of resin surfaces installed in hospitals, kitchens, closets, floors, offices, and other locations. Microorganisms living on these surfaces may pass to individuals through contact and/or food placed on these surfaces, and generate infections. This also happens on decorative surfaces made of these materials.

Therefore, the objective is to convert these resin surfaces into biocide surfaces, i.e. that microorganisms in contact with them be eliminated, and that the said surfaces remain free or microorganisms that can cause infections through contact.

Therefore, it would be desirable to have a biocide compound based on melamine-formaldehyde, urea-formaldehyde, and phenolic resins and on soluble copper salts, suitable for use together with different substrates and in an independent way.

One of the objectives of this invention is obtaining a biocide resin composition that includes one or more resins and more than one copper salt.

Another objective if this invention is obtaining a biocide material that includes, at least, one layer formed by a biocide compound of melamine-formaldehyde, urea-formaldehyde, phenol-formaldehyde, melamine-urea-formaldehyde, and phenolic resins in addition to soluble copper salts and a second layer formed by paper or other support.

Another objective of this invention is obtaining a molded biocide product that includes at least one resin in the form of powder, selected from melamine-formaldehyde, urea-formaldehyde, phenol-formaldehyde, melamine-urea-formaldehyde, and phenolic resins and more than one powder copper salt.

Besides, we seek that the melamine-formaldehyde resin gelation time be in the range from 5 to 10 minutes; 0.5 to 2 minutes for the urea-formaldehyde resin; and 3 to 10 minutes for the phenolic resins.

ABSTRACT OF THE INVENTION

This invention corresponds to a resin biocide composition that includes one or more solutions of selected melamine-formaldehyde, urea-formaldehyde, phenol-formaldehyde, melamine-urea-formaldehyde, and phenolic resins, and more than one copper salt soluble in aqueous systems and melamine-formaldehyde, urea-formaldehyde, and phenolic solutions. Copper salts are of the copper citrate, copper lysinate, copper gluconate, copper salicylate, copper phthalocyanine, copper chelate, copper oxalate, copper acetate, copper methionine, copper tartrate, copper glycinate, copper picolinate, copper aspartate, ammonia copper complexes, EDTA (ethylenediaminetetraacetic acid)-copper complexes, copper glycolate, copper glycerate, copper ascorbate type and, in general, copper salts of the organic type, R—Cu, R1-Cu—R2, where R, R1, and R2 can be alkyl chains ($C_3$-$C_{18}$) with one or more acid, aldehyde, ester, ether, hydroxyls, amino, or others in its structure.

Besides, this invention corresponds to molded biocide products that include one or more powder resins for molding, selected from melamine-formaldehyde, urea-formaldehyde, phenol-formaldehyde, melamine-urea-formaldehyde, and phenolic resins, and more than one powder copper salt soluble in aqueous systems and in melamine-formaldehyde, urea-formaldehyde, and phenolic solutions. Copper salts are of the copper citrate, copper lysinate, copper gluconate, copper salicylate, copper phthalocyanine, copper chelate, copper oxalate, copper acetate, copper methionine, copper tartrate, copper glycinate, copper picolinate, copper aspartate, ammoniac copper complexes, EDTA (ethylenediaminetetraacetic acid)-copper complexes, copper glycolate, copper glycerate, copper ascorbate type and, in general, copper salts of the organic type, R—Cu, R1-Cu—R2, where R, R1, and R2 can be alkyl chains ($C_3$-$C_{18}$) with one or more acid, aldehyde, ester, ether, hydroxyls, amino, or others in its structure.

Besides, this invention describes the procedure to obtain resin biocide compositions.

DETAILED DESCRIPTION OF THE INVENTION

This invention corresponds to a resin biocide composition that includes one or more resins selected from melamine-formaldehyde (MF), urea-formaldehyde (UF), phenol-formaldehyde (PF), melamine-urea-formaldehyde (MUF) and phenolic resins, and more than one copper salt soluble in aqueous systems and in melamine-formaldehyde, urea-formaldehyde, phenol-formaldehyde, melamine-urea-formaldehyde, and phenolic solutions, where the copper salt is selected from copper citrate, copper lysinate, copper gluconate, copper salicylate, copper phthalocyanine, copper chelate, copper oxalate, copper acetate, copper methionine, copper tartrate, copper glycinate, copper picolinate, copper aspartate, ammoniac copper complexes, EDTA (ethylenediaminetetraacetic acid)-copper complexes, copper glycolate, copper glycerate, copper ascorbate type and, in general, copper salts of the organic type, R—Cu, R1-Cu—R2, where R, R1, and R2 can be alkyl chains ($C_3$-$C_{18}$) with one or more acid, aldehyde, ester, ether, hydroxyls, amino, or others in its structure.

This invention corresponds to a resin biocide composition that includes adding resins as resin solutions, and copper salts as aqueous solutions containing the copper salts.

This invention corresponds to a resin biocide composition that includes adding resins as resins in the form of powder, and copper salts in the form of powder.

Copper salts are used combined in two or more of them, preferably in a combination of two or three. Copper salts are added to resins in an amount necessary for the copper ions concentration in the finished resin biocide composition to be between 20 and 2,500 ppm (parts per million), and preferable between 100 and 1,000 ppm. The finished resin biocide composition refers to the powder composition once copper salts have been mixed with resin or the dry composition, which corresponds to the biocide composition in the resin solution once water has evaporated from the resin solution mix and from the copper salts solution.

In the case of resin biocide compositions in solution, copper salts dissolve forming an aqueous solution with a pH in the 3.8 to 5.5 range, so that when mixed with the melamine-formaldehyde, urea-formaldehyde, phenol-formaldehyde, melamine-urea-formaldehyde and phenolic solution, the pH value in the resin solution is not significantly modified. A base or weak acid is used to adjust the pH, as applicable. Preferred acids are citric acid, tartaric acid, acetic acid, preferably of organic origin; preferred bases are ammonia hydroxide, methylamine, ethylamine, propyl amine, preferably of organic origin.

The procedure to obtain the resin biocide composition in a solution includes mixing more than one copper salt (soluble in the resin solutions) with a resin solution that includes one or more resin solutions before the gelation process ("polymerization") of the resin solution. Copper salts included in the resin solution are added as aqueous solution and they remain uniformly distributed in the resin and trapped (interlocked) in the resin polymer net during the polymerization process. In the said copper salts, radical R of the carbon chains with groups of carboxyl, acids, amines, and hydroxyls interweaves with the polymer forming a single structure, preventing them from detaching. Additionally, it is possible to use a catalyzer suitable for each resin, such as a p-toluene sulfonic acid solution for the melamine-formaldehyde resin and salts from a strong acid, preferably aluminum chloride or ammonium sulfate for the urea-formaldehyde resin. Catalyzers are usually necessary during the resin polymerization or gelation stage.

Copper salts used do not modify the resin polymerization (gelation) speed, which means that it is not necessary to modify the process. Optionally, it may be recommendable to use a chelating agent at a molar ratio from ½ to ⅕₀ in order to keep copper ions in a solution and prevent their precipitation. Preferably, chelating agents are EDTA and DTPA (diethylene triamine penta acetic acid).

Surfaces formed by these resins polymerization are, in general, solid, transparent, dirt-repellent, and easy to clean, of high hardness, resistant to alkalis and acids, and resistant to high temperatures.

The process to obtain powder resin compositions includes mixing the powder resin(s) with powder copper salts in a homogeneous mix, which is then molded at a temperature from 100° C. to 250° C., and at 50 to 400 atm pressure. Then, the molded mix is pressed from 1 to 10 minutes in order to obtain the molded final product.

One of the applications for these highly important resin biocide compositions is the obtaining of boards with decorative surfaces made of resin-impregnated paper. Boards may be medium density fiberboard, medium density plywood, and others. These are used in the manufacturing of furniture, closets, kitchen surfaces, and other applications. In the event boards are manufactured overlaying urea and then melamine resin, copper salts may be applied to both resins or only to the resin on the outer face.

Other applications for resin biocide compositions in this invention correspond to floating floors, decorative floors, and papers with decorative motifs, which are impregnated in resin, generally the resin aqueous solution containing a catalyzer that promotes polymerization (commonly called resin gelation). Then, the said items are submitted to a temperature between 80° C. and 250° C. for polymerization to occur on the surface and water to evaporate from the resins biocide composition solutions.

Furthermore, another application for resin biocide compositions in the present invention corresponds to the obtaining of boards based on paper impregnated with the resin composition in the present invention. Obtaining the board includes pressing the paper with the polymerized resin on both faces of a wood base at high pressure and temperature. This could be fiberboard or plywood. The obtained board surfaces, in the case of melamine resin, is of high hardness, water repellent, easy to clean, temperature resistant, and alkali and acid resistant properties. Besides, these boards have biocide properties that eliminate bacteria, fungus, and viruses in contact with the said surfaces in a very short time, preventing their growth and eliminating infection vectors. This is a very desirable property in areas where microorganisms may exist that could infect individuals, such as furniture, desks, school furniture, and other surfaces in hospital areas.

Papers used for impregnation are porous, from 10 g/m$^2$ to 200 g/m$^2$. Generally, papers are between 30 to 120 g/m$^2$. The resin biocide compositions solution in the present invention, i.e. melamine-formaldehyde, urea-formaldehyde, phenol-formaldehyde, melamine-urea-formaldehyde and phenolic resins are forced to penetrate the paper pores through rollers. These rollers are able to control the amount of resin that remains on the paper. The amount of resin on the paper may vary from 20 to 120 g/m$^2$ distributed on both faces of the paper.

Coated wood results from the impregnated paper, which includes a surface layer and a substrate. The surface layer is formed by the paper impregnated in the resin biocide composition in solution and the substrate is the wood.

Another application for resin compositions in solution in the present invention includes the application of the said composition to another type of substrates, such as ceramics, polymer sheets, and cardboard.

Furthermore, another of the resin composition applications is in toilet seats, door handles, containers, furniture components, kitchen utensils, and bathroom accessories obtained through powder resin molding processes.

In addition, the resin biocide composition can be used to protect adhesive mixes, melamine-urea-formaldehyde mixes, phenol-melamine-formaldehyde and phenol-urea-formaldehyde mixes, by themselves or with additives, such as starch, cellulose, or others from the action of microorganisms, but without including a catalyzer.

Besides, resin biocide compositions, in solution and in powder, include added additives that can be anti-dust, humidifying, and anti-foam agents, agents that promote flexibility, unmolding agents, agents that prevent surfaces from sticking (sheet to sheet), filling agents, adsorbent agents, agents that improve hardness, bleachers, colorants, pigments, and others.

As an alternative, addition of antimicrobial agents could be through the direct addition of copper salts to the resin solution.

Particularly, added copper salts do not modify the resin gelation time (polymerization) at normal operation temperatures.

Example 1

Paper surfaces were prepared with melamine resin and copper and then submitted to challenging tests in order to measure antibacterial activity. The test used is the International Standard ISO 22196 (ISO 22196-2007) (E). First Edition 2007-10-15. "Plastics—Measurement of Antibacterial Activity on Plastic Surfaces".

Antimicrobial activity measurements were taken using the prototype stem of methicillin resistant *Staphylococcus aureus* (MRSA) ATCC-43300.

Standard porous 80 g/m² paper was used in the production of melamine surfaces.

A solution based on melamine-formaldehyde is prepared that includes melamine-formaldehyde at 50%. Several bactericide solutions tested with the copper salts are prepared, at different copper concentrations. Then, several mixes are prepared based on the melamine-formaldehyde solution and on copper salt solutions, adding 0.797 parts of copper salt solution per 100 parts of each one of the said mixes. Additionally, melamine-formaldehyde resin biocide compositions include a melamine catalyzer (CYCAT 400 of CYTEC, corresponding to a p-toluene sulfonic acid solution) and some additives, such as a moisturizing agent (Alton 833), an unmolding agent (Alton R1000), an anti-adherent agent (Alton AT837), and an anti-dust agent (Alton AP100). Table 1 lists each one of the components or ingredients forming the resin biocide composition, and indicates their content in the total mix.

TABLE 1

Resin Biocide Composition for Paper Impregnation

| Ingredient | Parts in the Formula |
| --- | --- |
| Resin: | 93.81 |
| Melamine-formaldehyde (at 50%) | |
| Additives | 4.065 |
| Water | |
| Moisturizing agent | 0.125 |
| Catalyzer | 0.344 |
| Unmolding agent | 0.281 |
| Anti-adherent agent | 0.281 |
| Anti-dust agent | 0.297 |
| Bactericide solution | 0.797 |

Bactericide aqueous solutions containing copper salts were prepared by mixing two and three different types of copper salts. Copper salts were mixed in different molar ratios in order to obtain bactericide solutions of different concentrations. Table 2 shows each one of the prepared salt mixes, identified with letters B, C, D, E, F, G, H, Y, and J. Additionally, letter A represents the control solution without copper salts.

TABLE 2

Prepared Copper Salt Solutions and their Different Concentrations in ppm

| Test | Copper Salts in Bactericide Solution | Salts Molar Ratio in the Bactericide Solution (Cu) | Copper Ion ppm Present in the Finished Resin Biocide Composition (Solid Resin) |
| --- | --- | --- | --- |
| A | None (Control) | | 0 |
| B | Copper gluconate Copper glycinate | 3/1 | 100 |
| C | The same as B | 3/1 | 200 |
| D | The same as B | 3/1 | 500 |
| E | The same as B | 1/1 | 150 |
| F | The same as B | 1/3 | 150 |
| G | Copper gluconate Copper citrate | 1/1 | 500 |
| H | Copper glycinate Copper citrate | 1/1 | 1000 |
| I | Copper salicylate Copper lysinate | 4/1 | 1000 |
| J | Copper gluconate Copper glycinate Copper lysinate | 3/1/1 | 500 |

As shown in Table 2, nine copper salt solutions were prepared varying the type of copper salt added, the total number of copper salts added, the molar ratio between copper salts, and copper ppm to obtain in the solid resin. B, C, and D bactericide solutions include the same copper salts and the same molar ratio between them, but copper ppm to be obtained in the solid resin vary, i.e. the actual amount in weight to be added from each copper salt to the bactericide solution varies in order to obtain the different copper ppm in the solid resin. Table 2 does not show the actual amount in weight of copper salt parts to be added in order to obtain the corresponding copper ppm in the solid resin; however, the following is the methodology to calculate the actual amount in weight of copper salt parts for each case.

The following example is the calculation methodology showing the way to calculate the amount of copper salt weight that should be added in order to prepare a copper salt bactericide solution to obtain 100 copper ppm in solid resin (test B). For clarification, X is defined as the amount in weight of copper gluconate, and Y as the amount in weight of copper glycinate to add to the copper salts solution in order to obtain the 100 copper ppm in solid resin.

According to the biocide composition formula of the resin in Table 1, 93.81 parts of melamine-formaldehyde at 50% (in solution) are added to the total mix. This implies that 46.905 parts of solid resin (93.81×0.5) are actually added.

Considering that the solid resin amount is equal to 46.905 parts, this means that if we want to prepare a solution of 100 copper ppm in solid resin, 0.0046905 copper parts should be added per each 46.905 parts of solid resin:

$$\frac{100}{1,000,000} = \frac{\text{parts of copper}}{46.905}$$

Parts of copper = 0.0046905

In test B (Table 2), copper salts used are copper gluconate and copper glycinate, and their molecular weight is 453.8 Kg/Kgmole and 211.66 Kg/Kgmole, respectively. On the other hand, the copper atomic weight is 63.546. Copper atomic weight, together with the salts molecular weight, allow calculating the amount of copper in each mole of the copper salt molecule.

Copper gluconate 63.546/453.8=0.14

Copper glycinate 63.546/211.66=0.3

Therefore, one copper gluconate molecule mole contains 0.14 parts of copper, and one copper glycinate molecule mole contains 0.3 parts of copper.

Bearing in mind that the total of copper parts to add in order to obtain 100 copper ppm in the solid resin is 0.0046905, that each mole in the copper gluconate molecule contains 0.14 parts of copper, that each mole in the copper glycinate molecule contains 0.3 parts of copper, and that the copper gluconate/copper glycinate molar ratio is 3/1 (see table 2), values of X and Y can definitively be calculated:

$$0.14X + 0.3Y = 0.0046905$$

$$(X/453.8)/(Y/211.66) = 3/1$$

Resolving, we have: X=0.02515 parts

Y=0.00391 parts

Therefore, in order to obtain the 0.707 parts of bactericide solution (Table 1), it is necessary to add 0.02515 parts of copper gluconate, 0.00391 parts of copper glycinate and 0.76794 parts of water.

Also, in the case of test J (500 copper ppm in solid resin when mixing copper gluconate/copper glycinate/copper lysinate at 3/1/1 molar ratio) the amounts in weight of copper gluconate (X), copper glycinate (Y), and copper lysinate (Z) are:

$$\frac{500}{1{,}000{,}000} = \frac{\text{parts of copper}}{46.905}$$

Parts of copper = 0.0234525

Copper gluconate  63.546/453.8 = 0.14

Copper glycinate  63.546/211.66 = 0.3

Copper lysinate   63.546/355.5 = 0.179

$0.14X + 0.3Y + 0.179Z = 0.0234525$ $(X/453.8)/(Y/211.66) = 3/1$ $(X/453.8)/(Z/355.5) = 3/1$

Resolving, we have: X=0.10049 parts

Y=0.01562 parts

Z=0.02624 parts

Therefore, in order to obtain 0.797 parts of bactericide solution (test J, Table 1), 0.10049 parts of copper gluconate, 0.01562 parts of copper glycinate, 0.02624 parts of copper lysinate, and 0.65465 parts of water should be added.

Later, each one of the prepared resin biocide compositions was impregnated on paper. Each piece of paper was impregnated with 40 grams of the prepared resin biocide composition per square meter.

Impregnated papers were dried at a temperature of 100° C., and then pressed on the wood, forming a melamine surface. Wood melamine surfaces were submitted to the above described microbiological challenges in order to measure their antimicrobial activity.

The following Table 3 shows the surfaces antimicrobial results, measured as MRSA elimination percentages.

TABLE 3

MRSA Elimination Percentage on Paper Surfaces (Melamine Surfaces)

| Test | Cu ppm in Finished Resin Biocide Composition (Melamine-formaldehyde Resin) | MRSA Elimination % on Paper Surfaces (Melamine Surfaces) |
|---|---|---|
| A | 0 | −65% |
| B | 100 | 85% |
| C | 200 | 98% |
| D | 500 | 100% |
| E | 150 | 94% |
| F | 150 | 92% |
| G | 500 | 88% |
| H | 1,000 | 99% |
| I | 1,000 | 100% |
| J | 500 | 100% |

The control sample has a negative percentage, i.e. on the melamine surface formed by the melamine-formaldehyde resin biocide composition with no copper salt solutions, the MRSA bacteria reproduces. On the other hand, all melamine surfaces formed with melamine-formaldehyde resin biocide composition with copper salt solutions showed elimination of the MRSA bacteria; even D, I, and J solutions showed 100% of MRSA bacteria elimination.

Example 2

Paper surfaces treated with urea-formaldehyde resin compositions and copper solutions were prepared and submitted to challenge tests in order to measure antimicrobial activity. The test used is International Standard ISO 22196 (ISO 22196-2007 (E). First Edition 2007-10-15. "Plastics—Measurement of Antibacterial Activity on Plastics Surfaces".

Antimicrobial activity was measured using the prototype stem *Escherichia Coli*, ATCC-25922.

80 m²/g porous paper was used.

A resin biocide composition is prepared based on 50% urea-formaldehyde resins and copper salts. In addition, the resin biocide composition includes a urea catalyzer, which corresponds to strong acid salts, preferable aluminum chloride or ammonia sulfate. The components of the resin biocide composition are listed in Table 4, indicating their contents in the total mix.

TABLE 4

Resin Biocide Composition for Paper Impregnation

| Ingredients | Parts in Formula |
|---|---|
| Urea-formaldehyde solution (50%) | 85.370 |
| Water | 13.390 |
| Catalyzer | 0.385 |
| Bactericide solution | 0.855 |

A urea-formaldehyde resin solution is prepared and aqueous solutions containing copper salts are added. Solutions were prepared to add 0.855 parts of the bactericide solution (copper salts solution) tested in the urea-formaldehyde solution. Several biocide resin compositions were prepared, each one with different copper ion concentrations. Table 5 lists the different bactericide solutions (copper salt solutions) prepared and identified with the letters B2, C2, D2, E2, and F2. Letter A2 represents the control solution with no copper salts.

TABLE 5

Copper Salt Solutions Prepared and their Different Concentrations in ppm

| Test | Copper Salts in Bactericide Solution | Salts Molar Ratio in the Bactericide Solution (Cu) | Copper Ion ppm Present in the Finished Resin Biocide Composition (Solid Resin) |
|---|---|---|---|
| A2 | None (control) | | 0 |
| B2 | Copper gluconate Copper glycinate | 3/1 | 100 |
| C2 | Copper gluconate Copper citrate | 1/1 | 500 |
| D2 | Copper glycinate Copper citrate | 1/1 | 1000 |
| E2 | Copper salicylate Copper lysinate | 4/1 | 1000 |
| F2 | Copper gluconate Copper glycinate Copper lysinate | 3/1/1 | 500 |

Later, paper was impregnates with 50 grams of urea-formaldehyde resin biocide composition per square meter.

Impregnated papers were dried at 100° C. and then pressed on the wood, forming a ureic surface. The wood ureic surfaces were submitted to the above described microbiologic challenges in order to measure their antimicrobial activity.

Table 6 shows the antimicrobial results on ureic surfaces of wood treated with resin biocide compositions, measured as a percentage of Escherichia Coli elimination (ATCC-25922).

TABLE 6

Elimination Percentage of Escherichia Coli (ATCC-25922) on Paper Surfaces (Ureic Surfaces)

| Test | Cu ppm in the Finished Biocide Composition (Urea-formaldehyde Resin) | Elimination % of Escherichia Coli (ATCC-25922) on Paper Surfaces (Ureic Surfaces) |
|---|---|---|
| A2 | 0 | −15% |
| B2 | 100 | 80% |
| C2 | 500 | 95% |
| D2 | 1000 | 100% |
| E2 | 1000 | 100% |
| F2 | 500 | 100% |

The control sample has a negative percentage, i.e. the bacteria reproduces on the ureic surface formed by the urea-formaldehyde resin biocide composition with no copper salt solutions. On the other hand, all ureic surfaces formed by urea-formaldehyde resin compositions with copper salt solutions eliminated the Escherichia Coli (ATCC-25922) bacteria. Even copper salt solutions D2, E2, and F2 showed 100% bacteria elimination.

Example 3

Paper surfaces with melamine-formaldehyde resin biocide compositions and copper solutions were prepared and submitted to challenge tests in order to measure antimicrobial activity. The test used is International Standard ISO 22196 (ISO 22196-2007 (E). First Edition 2007-10-15. "Plastics—Measurement of Antibacterial Activity on Plastics Surfaces".

Antimicrobial activity was measured using the prototype stem Escherichia Coli, ATCC-25922.

80 $m^2$/g porous paper was used.

A solution based on melamine-formaldehyde is prepared, which includes melamine-formaldehyde at 50%. Several bactericide solution, tested with copper salts, are prepared with different copper concentrations. Then, several mixes based on the melamine-formaldehyde and copper salt solutions are prepared, adding 0.81 part of copper salts solution per 100 parts of each of the said mixes. In addition, resin biocide compositions include a melamine catalyzer (CY-CAT 400 of CYTEC, corresponding to a p-toluene sulfonic acid). Table 7 shows each one of the components or ingredients in the resin biocide composition, indicating its contents in the total mix.

TABLE 7

Resin Biocide Composition for Paper Impregnation

| Ingredients | Parts in the Formula |
|---|---|
| Melamine-formaldehyde solution (50%) | 94.83 |
| Water | 4.11 |
| Catalyzer | 0.25 |
| Bactericide solution | 0.81 |

Bactericide aqueous solutions containing copper salts were prepared by mixing two different types of copper salts. Copper salts were mixed in different molar ratios in order to obtain bactericide solutions with different concentrations. Table 8 shows each one of the prepared salt mixes, identified with letters B3, C3, and D3. Letter A3 represents the control solution with no copper salts.

TABLE 8

Prepared Copper Salt Solutions and their Different Concentrations in ppm

| Test | Copper Salts in Bactericide Solution | Salts Molar Ratio in Bactericide Solution (Cu) | Copper Ions ppm Present in the Finished Resin Biocide Composition (Solid Resin) |
|---|---|---|---|
| A3 | None (control) | | 0 |
| B3 | Copper gluconate Copper glycinate | 3/1 | 100 |
| C3 | Copper gluconate Copper citrate | 1/1 | 500 |
| D3 | Copper glycinate Copper citrate | 1/1 | 1000 |

Later, paper was impregnated with 40 grams per square meter of the melamine-formaldehyde resin biocide composition.

Impregnated papers were dried at 100° C. and then pressed on the wood, forming a melamine surface. The wood melamine surfaces were submitted to the above-described microbiologic challenges in order to measure their antimicrobial activity.

The following Table 9 shows antimicrobial results on the surfaces, measured as percentage of Escherichia Coli (ATCC-25922) elimination.

TABLE 9

Escherichia Coli (ATCC-25922) Elimination Percentage on Paper Surfaces

| Test | Finished Resin Biocide Composition (Melamine-formaldehyde Resin) | Escherichia Coli ATCC-25922 Elimination Percentage on Paper Surfaces (Melamine Surfaces) |
|---|---|---|
| A3 | 0 | −65% |
| B3 | 100 | 85% |

TABLE 9-continued

Escherichia Coli (ATCC-25922) Elimination Percentage on Paper Surfaces

| Test | Finished Resin Biocide Composition (Melamine-formaldehyde Resin) | Escherichia Coli ATCC-25922 Elimination Percentage on Paper Surfaces (Melamine Surfaces) |
|---|---|---|
| C3 | 500 | 98% |
| D3 | 1000 | 100% |

The control sample has a negative percentage, i.e. the bacteria Escherichia Coli (ATCC-25922) reproduces on the melamine surface formed by the melamine-formaldehyde resin biocide composition with no copper salt solutions.

Examples 1 and 3 show that the biocide effect is due to copper salts and not to process additives, as example 3 does not include additional process additives and results are equivalent to those in example 1, which includes the use of process additives.

Example 4

A square, 10×10 cm and 0.5 cm high molded product was prepared, also called plate. For this, an already prepared molding mix was used, 30% melamine-formaldehyde and 70% urea-formaldehyde (MF-UF) in the form of powder. Powder copper salts were added and mixed to obtain a homogeneous mix. Table 10 shows the components in resin compositions, and indicates their contents in the total mix. The mix was molded at approximately 170° C. and approximately at 30 MPa (296 atm) pressure. Then, it was pressed during approximately 2 minutes in order to obtain a molded plate.

TABLE 10

Powder Resins Biocide Composition

| | Parts in the Formula | | | | |
|---|---|---|---|---|---|
| Ingredients | A4 | B4 | C4 | D4 | E4 |
| MF-UF | 100 | 98.89 | 99.77 | 99.61 | 98.92 |
| Copper salts bactericide mix | 0 | 1.11 | 0.23 | 0.39 | 1.08 |

Copper salts were mixed at different molar ratios in order to obtain powder resin biocide compositions with different copper salt contents. Table 11 shows each one of the prepared salt mixes, identified with letters B4, C4, D4, and E4. Letter A4 represents the control sample with no copper salts.

TABLE 11

Prepared Copper Salt Mixes and their Different Concentrations in ppm

| Test | Copper Salts in Bactericide Mix | Salts Molar Ratio in the Bactericide Mix (Cu) | Copper Ion ppm in the Finished Resin Biocide Composition (Solid Resin) |
|---|---|---|---|
| A4 | Control, with no copper | | 0 |
| B4 | Copper gluconate Copper glycinate | 3/1 | 2000 |
| C4 | Copper gluconate Copper glycinate | 1/1 | 500 |
| D4 | Copper tartrate Copper salicylate | 1/1 | 1200 |

TABLE 11-continued

Prepared Copper Salt Mixes and their Different Concentrations in ppm

| Test | Copper Salts in Bactericide Mix | Salts Molar Ratio in the Bactericide Mix (Cu) | Copper Ion ppm in the Finished Resin Biocide Composition (Solid Resin) |
|---|---|---|---|
| E4 | Copper gluconate Copper lysinate | 1/1 | 1500 |

The plates obtained were submitted to microbiologic challenges as those described in example 1; MRSA was used to assess their effectiveness. Results appear in Table 12.

TABLE 12

MRSA Elimination Percentage on the Plates' Surface

| Test | Cu ppm in the Finished Resin Biocide Composition (Solid Resin) | MRSA Elimination Percentage on Plates Surface |
|---|---|---|
| A4 | 0 | −10% |
| B4 | 2000 | 99% |
| C4 | 500 | 84% |
| D4 | 1200 | 100% |
| E4 | 1500 | 100% |

The control sample has a negative percentage, i.e. the MRSA bacteria reproduces on the surface of the plate surface with no copper salts. On the other hand, all plates with copper salts showed the MRSA bacteria elimination; even D4 and E4 samples with copper showed 100% of MRSA bacteria elimination.

Example 5

As in example 4, a square, 10×10 cm and 0.5 cm high molded product was prepared, also called plate. The molded plate is made of powder urea-formaldehyde and powder copper salts. Additionally, some additives are included in the mix, such as a lubricant to help unmolding (zinc stearate), filling materials (cellulose, calcium carbonate, flour, or some mineral compound), and a pigment (titanium dioxide). Table 13 shows the components in powder resin compositions for molding, and indicates their contents in the total mix. Molding conditions were the same as in example 4.

Copper salts correspond to 1/1 molar mix of copper gluconate and copper glycinate, tested with two copper ion concentrations identified with letter B5 and C5. The indicated copper ppm correspond to copper ppm in the finished resin biocide composition (solid resin, plate). Besides, letter A5 represents the control sample with no copper salts.

TABLE 13

Powder Resins Biocide Composition

| Parts of | without copper A5 | 695 ppm Cu B5 | 1,946 ppm Cu C5 |
|---|---|---|---|
| Urea-formaldehyde | 67.50 | 67.50 | 67.50 |
| Cellulose | 30.00 | 29.50 | 28.60 |
| Zinc stearate | 0.5 | 0.5 | 0.5 |
| Titanium dioxide | 2.00 | 2.00 | 2.00 |
| Copper salts | 0.00 | 0.50 | 1.40 |
| Total | 100.00 | 100.00 | 100.00 |

Plates obtained were submitted to microbiologic challenges as those described in example 1; MRSA was used to assess effectiveness. Table 14 shows the results.

TABLE 14

MRSA Elimination Percentage in Plates' Surfaces

| Test | Cu ppm in Finished Resin Biocide Composition (Plate) | MRSA Elimination % on the Plate Surfaces |
|---|---|---|
| A5 | 0 | 0% |
| B5 | 695 | 90% |
| C5 | 1946 | 100% |

The control sample did not eliminate the MRSA bacteria reproduction, as elimination percentage was equal to zero. On the other hand, plates with copper salts showed the MRSA bacteria elimination; even sample C5 showed 100% MRSA bacteria elimination.

Plates obtained may be used in the manufacturing of toilet seats.

Example 6

A melamine-formaldehyde and copper salts molded plate was prepared. The plate molding conditions and size are the same as in examples 4 and 5. Additives in the mix are the same as in example 5. Table 15 lists the components forming the molding powder resin compositions and indicates their contents in the total mix.

Copper salts correspond to 1/1 molar mix of copper gluconate and copper glycinate. They were tested with two copper ion concentrations identified with letter B6 and C6. Indicated copper ppm correspond to copper ppm to have in the finished resin biocide composition (solid resin, plate). Letter A6 represents the control sample without copper salts.

TABLE 15

Powder Resins Biocide Composition

| Ingredient | without copper A6 | Cu 695 ppm B6 | Cu 1,946 ppm C6 |
|---|---|---|---|
| Melamine-formaldehyde | 67.50 | 67.50 | 67.50 |
| Cellulose | 30.00 | 29.50 | 28.60 |
| Zinc stearate | 0.50 | 0.50 | 0.50 |
| Titanium dioxide | 2.00 | 2.00 | 2.00 |
| Copper salts | 0.00 | 0.50 | 1.40 |
| Total | 100.00 | 100.00 | 100.00 |

Plates obtained were submitted to microbiologic challenges as those described in example 1; MRSA was used to assess effectiveness. Table 16 shows the results.

TABLE 16

MRSA Elimination Percentage on Plates' Surfaces

| Test | Cu ppm in Finished Resin Biocide Composition (Plate) | MRSA Elimination % on the Plate Surfaces |
|---|---|---|
| A6 | 0 | 0% |
| B6 | 695 | 90% |
| C6 | 1946 | 100% |

The same as in example 5, the control sample did not eliminate the MRSA bacteria reproduction, as elimination percentage was equal to zero. On the other hand, plates with copper salts showed the MRSA bacteria elimination; even sample C6 showed 100% MRSA bacteria elimination.

Results of examples 5 and 6 allow us to conclude that the copper salts action has the same independent effect as the resin being used, as the MRSA bacteria elimination percentages were the same in both examples at the same copper concentrations per plate.

Example 7

A phenol-formaldehyde base molded plate was prepared, with copper salts. Some additives were added to the mix, such as lubricant to help unmolding (zinc stearate); filling materials (cellulose, calcium carbonate, flour, or some other mineral compound); and an additive to increase the resin hardness and water resistance (hexamine). Table 17 shows the powder resin compositions for molding and indicates their contents in the total mix.

Copper salts correspond to 1/1 molar mix of copper gluconate and copper glycinate tested with two copper ion concentrations identified with letter B7 and C7. The indicated copper ppm correspond to ppm in the finished resin biocide composition (solid resin, plate). Letter A7 represents the control sample with no copper salts.

The plate molding conditions and size are the same as in examples 4 and 5.

TABLE 17

Powder Resins Biocide Composition

| Parts of | without copper A7 | 695 ppm Cu B7 | 1,946 ppm Cu C7 |
|---|---|---|---|
| Phenol-formaldehyde | 50.00 | 50.00 | 50.00 |
| Cellulose | 43.00 | 42.50 | 41.60 |
| Hexamine | 1.50 | 1.50 | 1.50 |
| Zinc stearate | 0.50 | 0.50 | 0.50 |
| Calcium carbonate | 5.00 | 5.00 | 5.00 |
| Copper salts | 0.00 | 0.50 | 1.40 |
| Total | 100.00 | 100.00 | 100.00 |

Plates obtained were submitted to microbiologic challenges as those described in example 1; MRSA was used to assess effectiveness. Table 18 shows the results.

TABLE 18

MRSA Elimination Percentage on the Plates' Surfaces

| Test | Cu ppm in Finished Resins Biocide Composition (Plate) | MRSA Elimination % on the Plate Surfaces |
|---|---|---|
| A7 | 0 | 0% |
| B7 | 695 | 91% |
| C7 | 1946 | 100% |

The same as results in examples 5 and 6, example 7 results allow us concluding that the copper salts action has the same independent effect as that of the resin used, as the MRSA bacteria elimination percentages were the same in all the examples, at the same copper concentrations per plate.

Example 8

An adhesive based on melamine-urea-formaldehyde and copper salts was prepared.

A commercial resin compound was used that corresponds to a urea-melamine formaldehyde Intan Wijaya Internacional IM-300 mix, which is a viscose, semi-opaque fluid, with 53 to 56% solids content.

The control sample, represented by letter A8, corresponds to the direct application of the IM-300 mix on a wooden plate, without applying copper salts. Once applied the IM-300 mix on the wood, it is left to harden. On the other hand, two IM-300 and copper salt mixes were prepared (1/1 molar mix of copper gluconate and copper lysinate). The addition of copper salts to the IM-300 mix should be such as to have 750 and 1500 Cu ppm in the adhesive (finished resin biocide composition), i.e. 0.54 parts (B8) and 1.08 (C8) parts, respectively. Each one of the said mixes is applied on a wooden plate and left to harden. Table 19 lists each one of the components forming the resin compositions for adhesives and indicates their contents in the total mix.

TABLE 19

Resins Biocide Composition in Mix for Adhesives

| Parts in the formula | A8 | B8 | C8 |
|---|---|---|---|
| IM-300 | 100 | 99.46 | 98.92 |
| Copper salts | 0 | 0.54 | 1.08 |

Wooden plates with the dry adhesive on their surface were submitted to microbiologic challenges as those described in example 1; MRSA was used to assess effectivity. Table 20 shows the results.

TABLE 20

MRSA Elimination Percentage on the Wooden Plates' Surfaces

| Test | CU ppm in Adhesive (Finished Resins Biocide Composition) | MRSA Elimination % on the Wooden Plates' Surfaces |
|---|---|---|
| A8 | 0 | −10% |
| B8 | 750 | 93% |
| C8 | 1500 | 100% |

Example 9

A resin biocide composition was prepared based on a mix of resin solutions of approximately 25% melamine-formaldehyde at 50%, and approximately 75% urea-formaldehyde at 50%, and copper salts. In addition, the resins biocide composition includes a CYTEC CYCAT 400 melamine catalyzer, corresponding to a solution of the p-toluene sulfonic acid and a urea catalyzer corresponding to strong acid salts, preferably aluminum chloride or ammonia sulfate. Copper salts correspond to 1/1 molar mix of copper gluconate and copper glycinate, tested with two copper ion concentrations and identified with letters B9 and C9. Letter A9 represents the control solution with no copper salts. Components forming the resins biocide composition, indicating their contents in the total mix, appear in Table 21.

TABLE 21

Resins Biocide Composition for Paper Impregnation

| Ingredient | Without copper Parts A9 | 953 Cu ppm Parts B9 | 1974 Cu ppm Parts C9 |
|---|---|---|---|
| Melamine formaldehyde (55%) | 24.92 | 24.86 | 24.80 |
| Melamine catalyzer | 0.08 | 0.08 | 0.08 |
| Urea formaldehyde (55%) | 74.58 | 74.40 | 74.20 |
| Urea catalyzer | 0.42 | 0.42 | 0.42 |
| Copper gluconate | 0.00 | 0.12 | 0.25 |
| Copper glycinate | 0.00 | 0.12 | 0.25 |
| Total | 100.00 | 100.00 | 100.00 |

Later, the paper was impregnated with 40 grams per square meters of the prepared resins biocide composition.

Impregnated papers were dried at 100° C. and then pressed on the wood to form a melamine-urea surface. The wood melamine-urea surfaces were submitted to microbiologic challenges according to example 1 in order to measure their antimicrobial activity.

Table 22 shows the surfaces antimicrobial results, measured as MRSA elimination percentages.

TABLE 22

MRSA Elimination Percentage on Paper Surfaces

| Test | Cu ppm in Finished Resins Biocide Composition (MF-UF Resin) | MRSA Elimination % on Paper Surfaces (Melamine-ureic Surfaces) |
|---|---|---|
| A9 | 0 | −15% |
| B9 | 952 | 96% |
| C9 | 1974 | 100% |

Example 10

A powder melamine-formaldehyde and copper salts molded plate was prepared. The plate molding conditions and size were the same as in examples 4 and 5. Table 23 lists the components forming the molding mix. In this experiment, only homogeneously mixed resin and copper salts were molded.

Copper salts correspond to 1/1 molar mix of copper gluconate and copper glycinate, tested with two copper ion concentrations and identified with letter B10 and C10. Letter A10 represents the control sample with no copper salts.

TABLE 23

Powder Resins Biocide Composition

| Ingredient | Without Copper A10 | 956 Cu ppm B10 | 2493 Cu ppm C10 |
|---|---|---|---|
| Melamine-formaldehyde | 100 | 99.5 | 98.7 |
| Copper salts bactericide mix | 0 | 0.5 | 1.3 |
| Total | 100 | 100 | 100 |

Copper ppm are calculated according to the copper contribution from each one of the salts and referred to the solid resin.

Plates obtained were submitted to microbiologic challenges as those described in example 1; MRSA was used to assess effectiveness. Table 24 shows the results.

TABLE 24

| Test | Cu ppm in Finished Resins Biocide Composition (Plate) | MRSA Elimination % on the Plate Surfaces |
|---|---|---|
| A10 | 0 | 0% |
| B10 | 959 | 91% |
| C10 | 2493 | 100% |

The control sample did not eliminate the MRSA bacteria reproduction, as its elimination percentage was equal to zero. On the other hand, plates with copper salts showed the MRSA bacteria elimination; even sample C10 showed 100% MRSA bacteria elimination.

The invention claimed is:

1. A resin biocide composition consisting of:
   a resin solution selected from melamine-formaldehyde and urea-formaldehyde resin solutions,
   a combination of two or three different organic copper salt solutions, wherein each of the two or three different organic copper salt solutions are soluble in aqueous systems and in melamine-formaldehyde and urea-formaldehyde, and wherein the combination of the two or three different organic copper salt solutions is selected from:
   copper gluconate-copper glycinate in a molar ratio from 3:1 to 1:3,
   copper gluconate-copper citrate in a molar ratio of 1:1,
   copper glycinate-copper citrate in a molar ratio of 1:1,
   copper salicylate-copper lysinate in a molar ratio of 4:1,
   copper tartrate-copper salicylate in a molar ratio of 1:1,
   copper gluconate-copper lysinate in a molar ratio of 1:1, and
   copper gluconate-copper glycinate-copper lysinate in a molar ratio of 3:1:1;
   a catalyzer for the resin solution;
   an anti-foam agent, and
   optionally one or more agents selected from an anti-dust agent, a moisturizing agent, an agent promoting flexibility, an unmolding agent, an agent that prevents surfaces from sticking, a filling agent, an adsorbing agent, and a bleacher;
   wherein when the combination of the two or three different organic copper salt solutions and the resin solution are mixed, a homogenous mix is obtained,
   a copper ion concentration in the resin biocide composition is between 20 and 2500 ppm when the resin biocide composition is dried, and
   the resin biocide composition does not contain phenol-formaldehyde resin.

2. The resin biocide composition according to claim 1, wherein the combination of the two or three different organic copper salt solutions has a pH between 3.8 and 5.5.

3. The resin biocide composition according to claim 1, wherein the copper ion concentration in the resin biocide composition is between 100 and 1000 ppm when the resin biocide composition is dried.

4. The resin biocide composition according to claim 1, wherein the resin solution is the melamine-formaldehyde resin solution and the catalyzer for the resin solution is p-toluene sulfonic acid solution.

5. The resin biocide composition according to claim 1, wherein the resin solution is the urea-formaldehyde resin solution and wherein the catalyzer is one of aluminum chloride or ammonia sulfate.

* * * * *